(12) United States Patent
Ngai et al.

(10) Patent No.: US 9,104,728 B2
(45) Date of Patent: Aug. 11, 2015

(54) QUERY LANGUAGE TO TRAVERSE A PATH IN A GRAPH

(71) Applicants: Alan Honkwan Ngai, Santa Clara, CA (US); Jean-Christophe Martin, San Jose, CA (US); Xu Jiang, Shanghai (CN); Cheng Xu, Shanghai (CN)

(72) Inventors: Alan Honkwan Ngai, Santa Clara, CA (US); Jean-Christophe Martin, San Jose, CA (US); Xu Jiang, Shanghai (CN); Cheng Xu, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/626,636

(22) Filed: Sep. 25, 2012

(65) Prior Publication Data

US 2014/0089293 A1    Mar. 27, 2014

(51) Int. Cl.
*G06F 17/30* (2006.01)
(52) U.S. Cl.
CPC ................ *G06F 17/30463* (2013.01)
(58) Field of Classification Search
USPC ......... 707/602, 604, 607, 687, 705, 790, 713, 707/706
See application file for complete search history.

(56) References Cited

U.S. PATENT DOCUMENTS

| 6,182,121 | B1 * | 1/2001 | Wlaschin | 709/215 |
| 2005/0289125 | A1 * | 12/2005 | Liu et al. | 707/3 |
| 2006/0248045 | A1 * | 11/2006 | Toledano et al. | 707/2 |

* cited by examiner

*Primary Examiner* — Sana Al Hashemi
(74) *Attorney, Agent, or Firm* — Schwegman Lundberg & Woessner, P.A.

(57) ABSTRACT

A query language used to traverse a path in a graph-based model is provided. The system comprises a parsing module to parse a query comprising query phrases. The respective query phrases composed of an object-type identifier and a filter where the object-type identifier corresponds to respective repositories and the filter is used to identify at least a portion of the objects associated with the object-type in the respective repositories. A planning module identifies the respective repositories corresponding to the object-type identifier within each of the one or more query phrases and generates an execution plan describing data to be retrieved according to the respective repositories and results of a preceding query phrase within the query. A translation module translates the respective query phrases into respective translated queries that are readable by the respective repositories and including the filter. An execution module implements the execution plan using the translated queries.

20 Claims, 6 Drawing Sheets

QUERY LANGUAGE TO TRAVERSE A PATH IN A GRAPH

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: copyright eBay, Inc. 2012, All Rights Reserved.

TECHNICAL FIELD

The present application relates generally to the technical field of network communication and, in one specific example, to a query language to traverse a path in a graph.

BACKGROUND

In a datacenter environment, many resources may be used to provide various services via, for example, a web site. The resources may include hardware resources and software resources executed by the hardware resources. The resources may each be associated with metadata stored in various repositories distributed across a number of datacenters. Processing queries about the metadata may require accessing multiple repositories. Typically, a query system might join two or more data structures determine the results of the query. However, this process is resource-consuming and time consuming. Further, repositories having diverse data structures cannot be joined so certain queries cannot be processed.

BRIEF DESCRIPTION OF THE DRAWINGS

Some embodiments are illustrated by way of example and not limitation in the figures of the accompanying drawings in which.

DETAILED DESCRIPTION

Example methods and systems to use a query language to traverse a path in a graph are described. In the following description, for purposes of explanation, numerous specific details are set forth in order to provide a thorough understanding of example embodiments. It will be evident, however, to one skilled in the art that the present invention may be practiced without these specific details. The terms "node" and "object" are used interchangeably herein.

In a datacenter, or other computing environment, metadata describing instances of hardware or software may be stored in several locations and in several incompatible formats. Typically, to determine an answer to a query that requires data from more than one table, a user may execute one or more computationally-expensive table joins or may run separate queries on each table and manually combine and filter the results.

A query language is introduced that allows a network administrator to query multiple tables residing on diverse database platforms using a single query and avoiding database joins. The diverse database platforms may use diverse languages and structures to maintain the data. Accordingly, one or more of the methodologies discussed herein may obviate a need for computationally intensive queries and database joins, which may have the technical effect of reducing computing resources used by one or more devices within the system. Examples of such computing resources include, without limitation, processor cycles, network traffic, memory usage, storage space, and power consumption.

The query language is used to traverse tree or graph based model using a declarative approach. Some embodiments may be used with non-relational database. At each stage of the query processing, the relevant results may be filtered or sorted and returned, for further processing. The result of the query may be translated into a traditional database.

Figure 1:
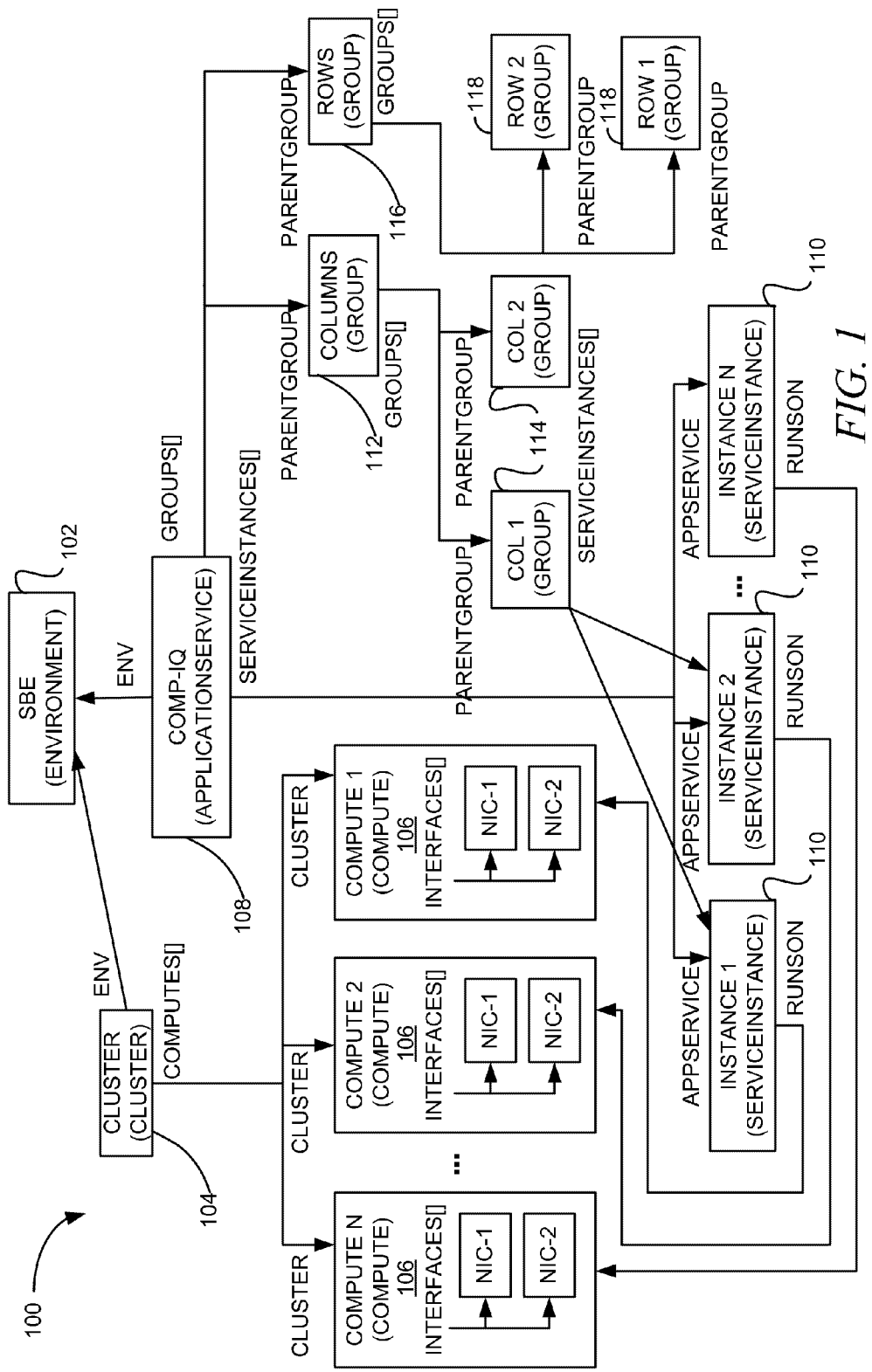
FIG. 1 is a diagram depicting content management system (CMS) data that may be queried, within which one example embodiment may be deployed.

FIG. 1 is a diagram depicting a graph-based model of content management system (CMS) data 100 that may be queried. The CMS data may describe hardware and software resources as nodes or objects within a large computing environment such as a cloud, computing environment. The CMS data 100 depicts nodes that are each associated with an object-type. The object-type of the node describes the type of the node. Object-types include, for example, environment, cluster, compute, interface, application service, group, and service instance. For each object-type a repository stores records describing the nodes of that object-type. Each repository can be queried using a database-specific query. Examples of nodes include a high-level environment node 102 describing a logical group including secondary nodes for clusters 104 of the object-type cluster and comp-iq 108 of the object-type application services. The cluster node 104 may describe a separate logical group of subnodes 106 corresponding to discrete compute units (e.g., hardware resources used to compute data such as servers or processors) of object-type compute. The respective compute unit nodes 106 may further describe logical groups of other hardware resources associated with the respective compute unit such as interfaces (e.g., network interface controllers (NICs)).

Likewise, the application service node 108 may describe two types of logical groups. The first of these logical groups being object-types service instances such as instances 110 which, in turn, are associated with the compute unit 106 that is executing the respective service instance. The second of these logical groups is of the object-type groups that further describe groups as sub-groups of the groups. As depicted, a group instance may be columns 112 associated with group instances Column 1 114 and Column 2 114. These group instances may, in turn, describe the instances 110 associated with each respective group.

At each node, the data describing the logical group associated with each node (e.g., the subnodes of the node or parent nodes of the node) is stored in a repository that may or may not be shared with other nodes of the same or different object-type. The repository may be structured independently of the other repositories. Repositories can exist on different database platforms, including but not limited to traditional RDBMS's (e.g. MySQL, Oracle), column databases (e.g., Cassandra, HBase), document databases (e.g. MongoDB, CouchDB), etc.

The relationships between the nodes are depicted by one-way arrows in FIG. 1. The relationships indicate which logical groups are exposed by the record of the node in the repository. The relationships may be many-to-one, one-to-many, or recursive. One example of a many-to-one relationship included in FIG. 1 is the relationship labelled environment "ENV" between each of nodes 104 and 108 to node 102. The one-to-many relationships of FIG. 1 are depicted using the suffix "[ ]". For example, the node 104 is associated with a one-to-many relationship labelled "COMPUTES[ ]" to each compute node 106 within the cluster described by node 104. A recursive relationship may be used to traverse the graph in reverse. Examples of recursive relationships in FIG. 1 are labelled "CLUSTER", "APPSERVICE", and "PARENTGROUP". In the example of recursive relationship labelled "APPSERVICE", the node 110 labelled "SERVICE INSTANCE" may include a application service node 108 "APPLICATION SERVICE".

Figure 2:
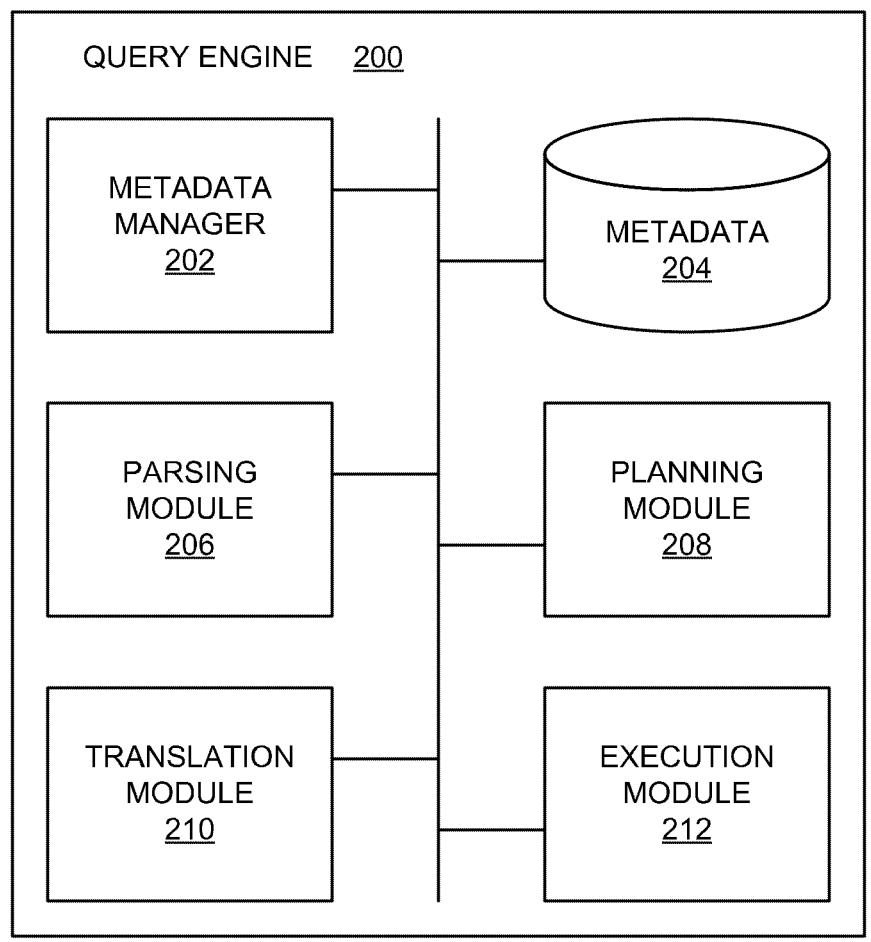
FIG. 2 is a block diagram of an example query engine, according to various embodiments.

FIG. 2 is a block diagram of an example query engine 200, according to various embodiments. The query engine 200 is implemented as a system in hardware and/or software to receive a query and to provide an execution plan based on information about the various repositories.

The query engine 200 includes a metadata manager 202 that accesses metadata database 204. The metadata database 204 stores records identifying each repository where the data thr each node in the CMS data of FIG. 1 is stored. The metadata database 204 may further include records identifying the language or structure of the respective repositories.

A parsing module 206 is configured to receive the query and to analyze the query, made of a sequence of words, numbers, characters, and punctuation marks, to determine its grammatical structure with respect to the syntax described herein. The syntax includes a series of query phrases that are each used to identify a node and dictate a filter or relationship to apply to the node. The query may span multiple nodes and so include multiple phrase. A query may not traverse the same node twice. In some instances, a single query phrase may be used to traverse more than one node.

The master syntax used to structure queries is as follows:

<store-type> "://" <anchor-type> <match-filter> <output-control> { "," <output-flag><relation-attribute><match-filter> <output-control> }

A query begins with a "store-type" that indicates the collection of data to be queried. In the examples described herein, the collections are labelled "wisb" ("way it should be") and "wiri" ("way it really is"). Additional or alternative collections may be queried based on the metadata stored in the metadata database 204.

The query then includes the characters "://" and concludes with one or more query phrases. The query phrase begins with the identification of an object type. Each node in the CMS is associated with an object-type. The first query phrase of the query identifies the object-type of the anchor node, labelled "anchor-type", from which the graph traversal begins. The second portion of each query phrase is optional and indicates a desired attribute filter or relationship to other objects and is indicated by curly brackets, square brackets, or parenthesis. The query phrases are separated by a separator such as the "." character.

Subsequent query phrases within the query identify further nodes to be traversed according to object-type, referred to as "match-filters" because they operate to filter out match objects immediately preceding a filter in the second portion of the query phrase. At least one query phrase in a query is referred to as an "output-control" because it dictates the objects to be returned to the user.

The second portion of each query phrase is optional and may be designated using curly brackets (as depicted by the master syntax), square brackets, and/or parenthesis. The second portion of the query phrase includes a filter or relationship to another object by which to filter the objects at the node identified by the first portion of the query phrase. Various operations may be included in the second portion. Example operators that may be used are shown in Table 1 where the second portion of the query phrase is set off using square brackets in the examples. Attribute names recorded in the metadata are identified using the character "@" and "*" acts as a wildcard character.

TABLE 1

| OPERATORS | DESCRIPTION | EXAMPLE |
| --- | --- | --- |
| = != < > <= >= | comparison | [@name = "foo"] |
| =~ | regular expression match | [@name =~ "^s.*"] |
| ( ) | grouping | [(@cpu > 35)] |
| and or | combinatorial | [(@name = "foo") and (@healthStatus = "healthy")] |
| In | list membership. To be used on a list of values, not a list of objects. | ["1.0" in @versions] |
| Not | boolean | [not ("1.0" in @versions)] |

If an object-type other than the final object-type in the query is desired as the objects to be returned, the "output-control" objects may be designated within the second portion of the query phrase using the output-flag indicated by the operator "{*}".

Example queries are included below to demonstrate how queries may constructed

TABLE 2

| Expression | Description |
| --- | --- |
| wiri://Group[@name = "comp-iq"] | matches all Groups whose name is 'comp-iq' in the wiri store |
| wisb://Group[@name =~ "^comp.*"] | matches all Groups who name begins with 'comp' in the wisb store |
| wisb://Group | matches all Group objects |
| wiri://ServiceInstance[(@name =~ "^foo.*") and (@healthStatus = "healthy")] | matches all ServiceInstance objects who name is prefixed by 'foo' and contains an attribute 'healthStatus' with value of 'healthy' |
| wiri://ServiceInstance[@healthStatus] | matches all ServiceInstance objects with any healthStatus. ServiceInstances without the 'healthStatus' attribute will not be returned |

TABLE 3

| | |
|---|---|
| wisb://ApplicationService['v2' in @versions] | matches all ApplicationService instances where the list property 'versions' contains an element of value 'v2' |
| wiri://ApplicationService.groups[@name = "comp-iq"] | returns list of groups referenced by AppService:comp-iq |
| wiri://ApplicationService.groups[@name = "comp-iq"](*) | same as above, but explicitly specifying objects to return via '(*)' operator |
| wiri://ApplicationService.groups(@name = "comp-iq")(@name.@lastUpdated) | same as above, only return the 'name' and 'lastUpdated' attributes within the object |
| wiri://ApplicationService(*).groups[@name = "comp-iq"](*) | same matches as above, but return both ApplicationServices and Groups |
| wisb://Compute(*).interfaces[@mac = "00:21:28:A3:07:1A"] | matches all NodeService instances where any interface has a mac address value that matches "00:21:28:A3:07:1A. Note that only the Compute objects are returned, not the objects referenced by interfaces |
| wiri://ApplicationService[@name = "comp-iq"].groups[@name = "columns"].groups[@name = "col1"].serviceInstances | return service instances under column 1 of comp-iq |
| wiri://ApplicationService[@name = "comp-iq"].groups[@name = "rows"].groups(*).serviceInstances[@healthStatus = "failed"] | return all rows were at least 1 service instance is failed |

The parsing module 206, upon parsing the query, generates an abstract syntax tree (AST). The AST is a tree representation of the abstract syntactic structure of query written in a programming language. Each node of the tree denotes a construct occurring in the execution of the query. The AST indicates the objects to be returned to the user.

A planning module 208 is configured to evaluate the AST and determine if any of the nodes within the query can be combined or embedded within other nodes, for example, by virtue of sharing an object-type. The planning module 208 may request that the metadata manager 202 retrieve records from the metadata database 204 corresponding to the identified node. The record includes a description of the database structure and language. When the structure and language of the respective repository is known, the planning module 208 makes a determination based on whether two or more consecutive query phrases may be evaluated by accessing data stored in the same repository or if the respective repositories are written in the same query language with the same structure. The pluming module 208 may also, for example, improve the order of the queries, rewrite some queries, or cache query results.

A translation module 210 is configured to identify a repository storing records about the node identified in the first portion of the query phrase. The translation module 210 may request that the metadata manager 202 retrieve records from the metadata database 204 corresponding to the identified node. The record includes a description of the database structure and language. When the structure and language of the respective repository is known, the query phrases are translated into the language of the repository.

The planning module 208 and the translation module 210 may operate in parallel or in serial during operation. The output of the planning module 208 and the translation module 210 is an execution plan that describes the actions to be performed to obtain the results of the query. The execution plan identifies each repository to be accessed and the queries to run on each repository. The execution plan further indicates how the results of each query run on each repository are to be combined, filtered, sorted, or otherwise operated on to achieve the desired results.

An execution module 212 is configured to implement the execution plan. The execution module 212 may access with the repositories corresponding to each node in the query or may communicate with repository managers that access the respective repositories. The execution module 212 may run the queries in a sequence defined by the execution plan or in another order. In some instances, the execution module 212 may operate on the results of each search corresponding to a query phrase before proceeding to the next search corresponding to the next query phrase. In other instances, the execution module 212 may run multiple queries in parallel and operate on the results of those queries.

Figure 3:
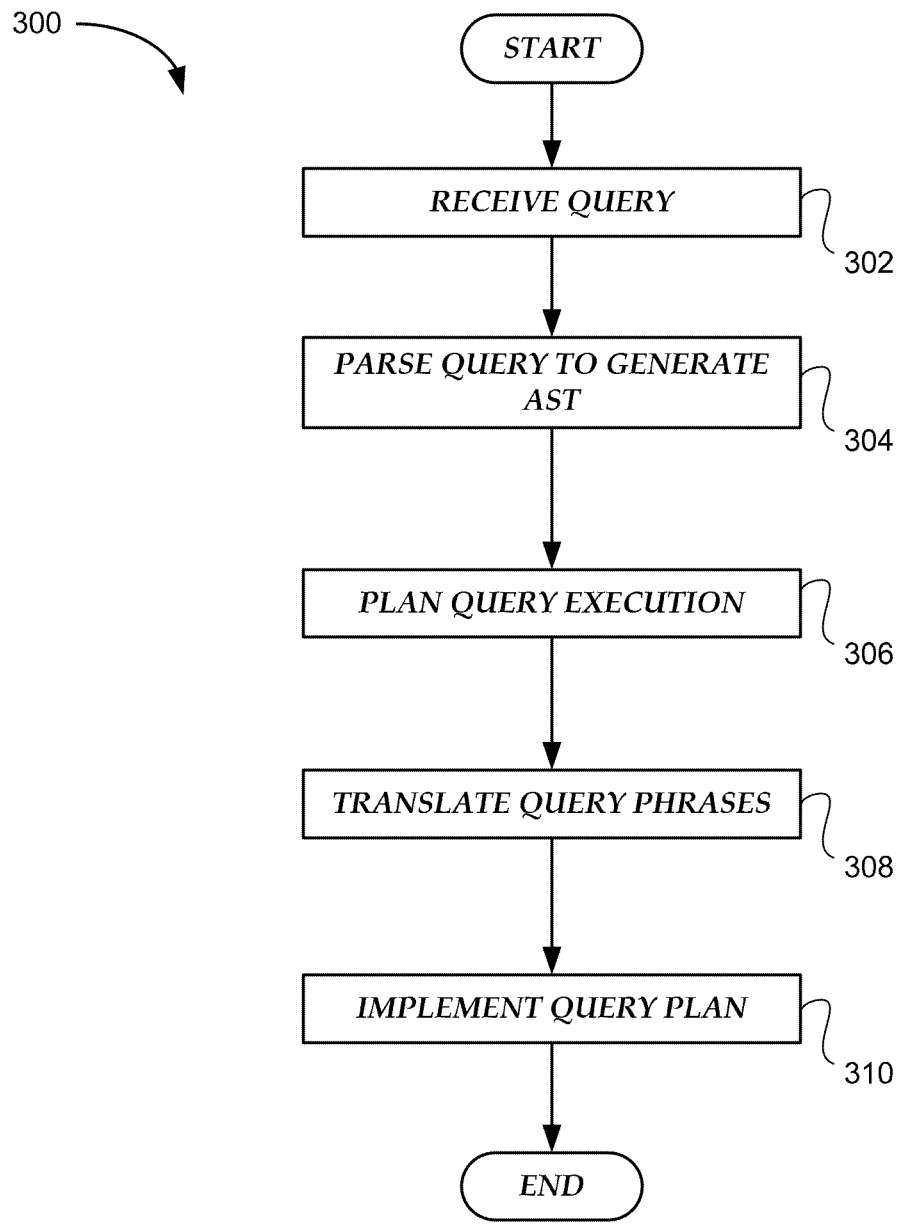
FIG. 3 is a flowchart illustrating an example method, according to various embodiments.

FIG. 3 is a flowchart illustrating an example method 300, according to various embodiments. The method 300 may be performed by the query engine 200.

In an operation 302, the query is received from the user. The query specifies the collection to be searched and includes one or more query phrases identifying an object-type and filter to apply to the object-type. In an operation 304, the query is parsed and an AST is generated. The AST is used, in an operation 306, to plan the execution of the query. The planning may be based on the respective repositories to be accessed, the language that a query phrase is translated into to query the repositories, and the like. The query, or portions thereof, is translated in an operation 308. Operations 306 and 308 may be performed as a combined operation, in reverse order, or in other variations. The output of the operations 306 and 308 is an execution plan. In an operation 310, the execution plan is implemented and the results of the query are returned to the user.

Figure 4:
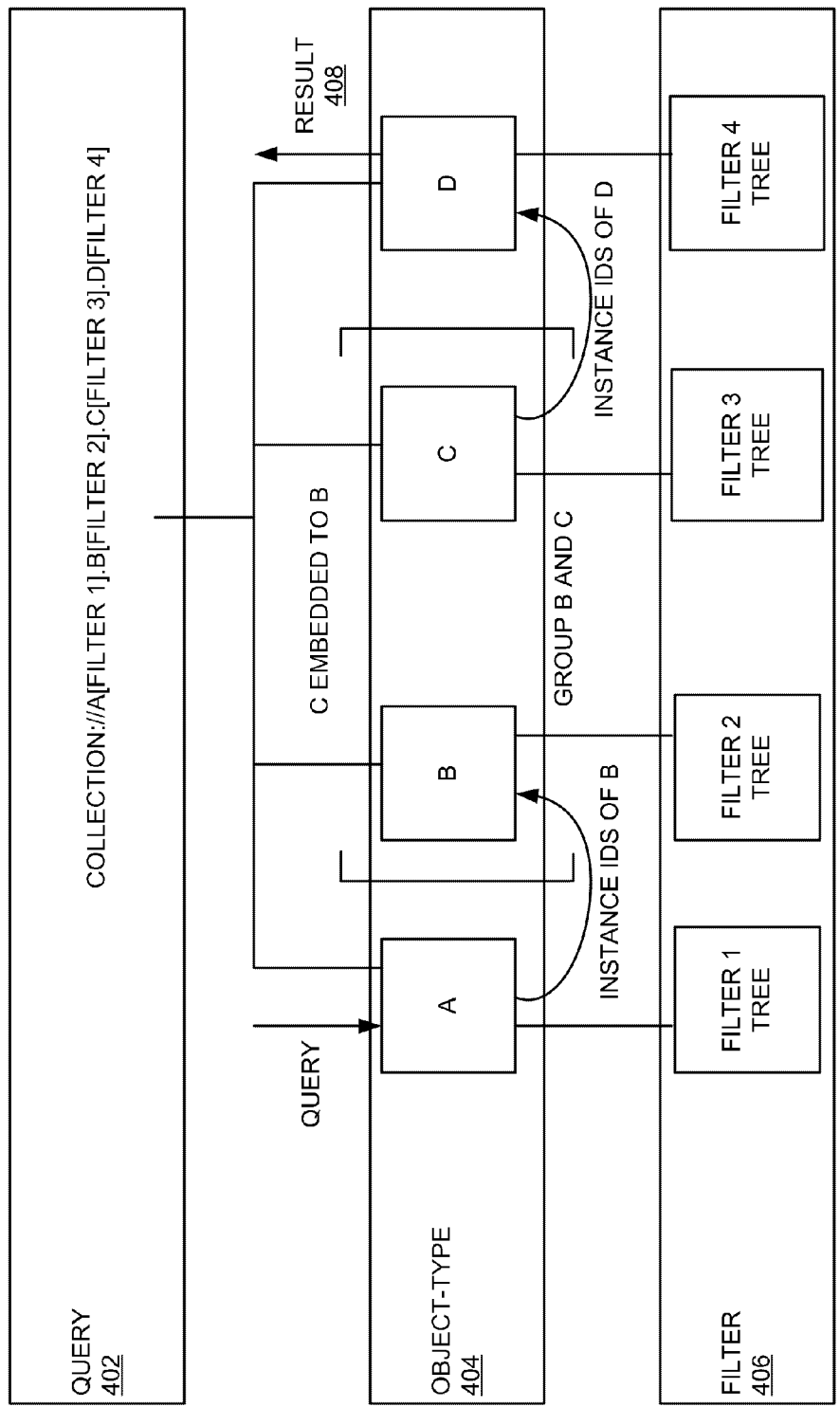
FIG. 4 is a diagram depicting an example of query processing, according to an example embodiment.
Figure 5:
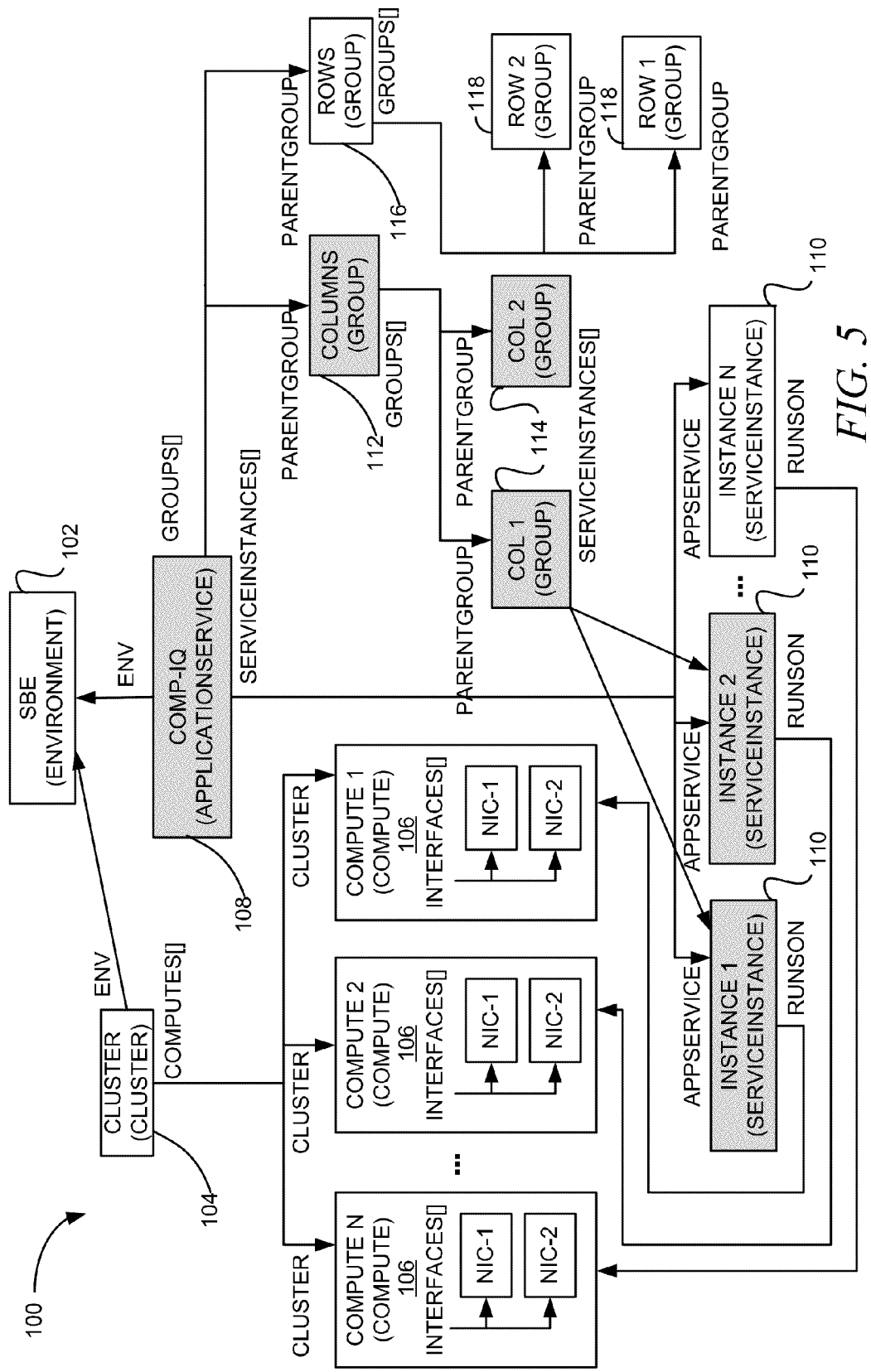
FIG. 5 is the diagram of FIG. 1 depicting execution of a query, according to the example embodiment of FIG. 4.

FIG. 4 is a diagram depicting an example of query processing, according to various embodiments. The diagram depicts an example of how an example query might be parsed, planned, translated, and executed in operation. This illustration is provided as an example with the understanding that other queries may be parsed, planned, translated, and executed differently depending on the query. FIG. 5 is the diagram of FIG. 1 depicting execution of the query according to the example embodiment of FIG. 4. The two figures are discussed concurrently to provide a detailed explanation of how the query is processed.

The submitted query 402 is given generically as:
COLLECTION://A[FILTER 1].B[FILTER 2].C[FILTER 3].D[FILTER 4]
where "collection" identifies the collection to be queried in a system having more than one collection of CMS data. The query 402 includes four query phrases relationship to apply to the node (e.g., filters 1, 2, 3, and 4) in a second portion. The query 402 corresponds in structure to the actual query:

wiri://ApplicationService[@name="comp-iq"].groups [@name="columns"].groups{*}.serviceInstances [@healthStatus="failed"]

where "wiri://" identifies the collection to be searched. "ApplicationService", "groups", and "service instances" identify object types in the CMS data in the first portion of the query phrases. In the second portion of the query phrases, there are filters and an output flag ("{*}") to be applied to the object types.

The query path begins at the "anchor object-type A", or in the above example, at an ApplicationService object-type such as node 108. Because the CMS data 100 may include many nodes of the object-type, "ApplicationService" (not depicted), the anchor node is followed by the filter "FILTER 1" in square brackets to identify the specific anchor node (or nodes). In the actual query, the filter 206 Filter 1 corresponds to [@name="comp-iq"] indicating, that only the nodes of the object-type, application services and named "comp-iq" be returned.

The ApplicationService object-type 404 may be stored in a first repository according to a first structure and language. The query engine 200 parses the first query phrase, identifies the first repository and first structure and language of the first repository based on metadata stored in the metadata database 204. The planning module 208 determines how to structure the query within the first repository and the translation module 210 translates the query phrase into a query that is executable within the first repository. The results of running this first quern are the instance IDs (e.g., nodes named "comp-iq") of the nodes of object-type B found in the first repository.

For the query phrases "B[FILTER 2].C[FILTER 3]" that correspond to the actual query phrases "groups [@name="columns"].groups{*}", the planning module 208 may determine that both are of the "groups" object-types and are stored in the same repository or in the same data structure or language. The planning module 208, in conjunction with the translation module 210, determines that object C is embedded into object B. Thus, the second and third query phrases can be combined or manipulated to reduce the number of queries made to the repository.

The instance IDs returned from the first search of the first repository are passed to a search system running a search on the second repository. The object-type B "groups" associated with the ApplicationService object-type named "com-iq" is filtered by the objects named "columns" using the filter 406 filter 2 tree. The object-type C "groups" is not filtered but is followed by an output flag. The output flag indicated that objects within this group are the desired outputs. When these two query phrases are evaluated, the filter 406 filter 3 tree returns a list of the nodes 114 of the group "Columns" 112 that are associated with the ApplicationService object-type named "com-iq".

The final query phrase, "serviceInstances [@healthStatus="failed"]" acts as a match-filter on the nodes 114 returned from the group objects. The identified service instances belong to at least one group within the broader group "Columns" are filtered by filter 406 filter 4 tree according to the attribute "healthstatus" being "failed". The output of the query engine 200 is a list of the columns where at least one service instance has failed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
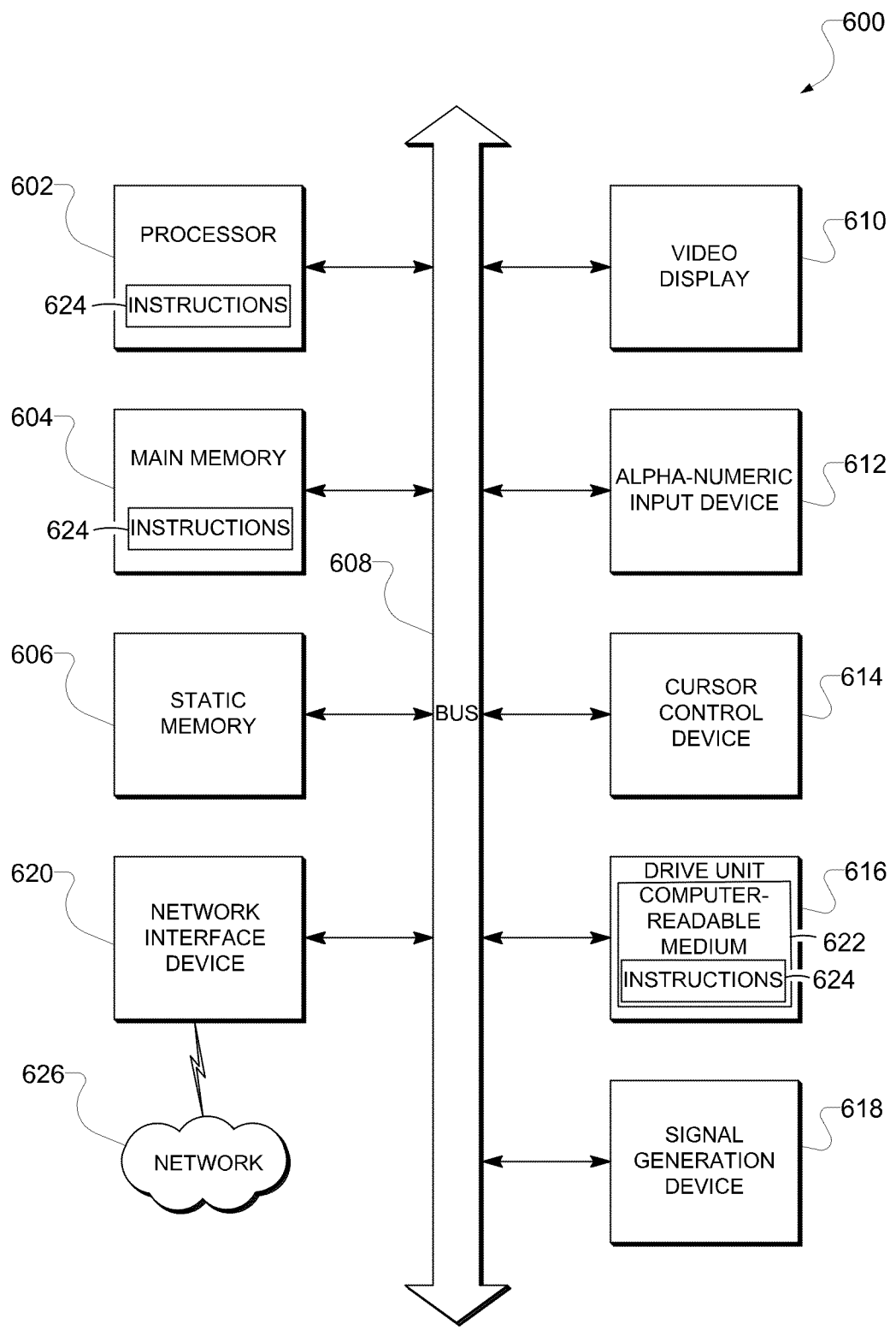
FIG. 6 is a diagrammatic representation of machine in the example form of a computer system within which a set of instructions, for causing the machine to perform any one or more of the methodologies discussed herein, may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (SIB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (CPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network, ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
a parsing module configured to, using one or more processors, parse a query comprising a first query phrase subsequent query phases, each of the first query phrase and subsequent query phrases comprised of an object-type identifier that corresponds to respective repositories, the subsequent query phrases comprised of a filter used to identify at least a portion of matched objects associated with the object-type in the respective repositories;
a planning module configured to:
identify shared object-type identifiers between each of the first and subsequent query phrases
determine shared data to be retrieved from a single respective repository based on any shared object-type identifiers between each of the first and subsequent query phrases;
retrieving an instance ID returned from a search system of the first query phrase and passing the instance ID to a search system of the subsequent query phases on the respective repositories;
returning a result from the query without database joins based on the identified shared object-type identifiers, determined shared data, retrieved instance ID, and filtered matched objects;
generate an execution plan identifying data to be retrieved according to the respective repositories and the returned result;
a translation module configured to translate, according to the execution plan, the respective query phrases into respective translated queries that are readable by the respective repositories corresponding to the object-type identifier within each of the one or more query phrases, the translated queries including the filter; and
an execution module configured to implement the execution plan and return the result from the query without database joins.

2. A method comprising:
parsing a query comprising a first query phrase and subsequent query phrases, each of the first query phrase and subsequent query phrases comprised of an object-type identifier that corresponds to respective repositories, the subsequent query phrases comprised of an associated filter, where the filter is used to identify at least a portion of matched objects associated with the object-type immediately preceding the subsequent query phrase in the respective repositories, and using the parsed query to generate an abstract syntax tree representation of an abstract syntactic structure of the query;
identifying shared object-type identifiers between each of the first and subsequent query phrases;
determining shared data to be retrieved from a single respective repositories based on any shared object-type identifiers between each of the first and subsequent query phrases;
retrieving an instance ID returned from a search system of the first query phrase and passing the instance ID to a search system of the subsequent query phrases;
returning a result of the query based on the identified shared object-type identifiers determined shared data, retrieved instance ID, and filtered matched objects;
generating an execution plan describing data to be retrieved according to the respective repositories and the returned results;
translating, according to the execution plan, the respective query phrases into respective translated queries that are readable by the respective repositories corresponding to the object-type identifier within each of the one or more query phrases, the translated queries including the filter; and
implementing the execution plan and returning a result from the query without database joins.

3. A non-transitory machine-readable storage medium having instructions embodied thereon, the instructions executable by a processor for performing a method comprising:
parsing a query comprising:
a store type indicating at least one collection to be queried;

a first query phrase comprising an object type, and an associated filter, the object type indicating a node or object from which a graph traversal begins, the associated filter indicating a desired attribute filter or relationship to other objects; and a subsequent query phrase comprising a subsequent object type and an associated subsequent fitter, the subsequent filter indicating a desired subsequent attribute filter or relationship to other objects for the subsequent object type;

identifying, from the parsed first query phrase, a first repository and a first structure and language of the first repository based on metadata stored in a metadata database;

structuring a first query executable within the first repository, the result of which comprises at least one instance identifier of nodes within the first repository satisfying the conditions of the associated filter;

identifying, from the parsed query phrase, a subsequent repository from the parsed subsequent query phrase;

structuring a subsequent query executable within the subsequent repository;

using the at least one instance identifier and subsequent query to search the subsequent repository; and receiving a result compliant with the first query phrase and the subsequent query phrase without the need to execute database joins.

4. The system of claim 1, further comprising a metadata module to manage metadata describing the respective repositories.

5. The system of claim 1, further comprising metadata database to store records describing the respective repositories.

6. The system of claim 1, wherein the query further comprises an indication of a collection to be queried.

7. The system of claim 1, wherein the query includes an output flag indicating the object-type of results returned by the execution module.

8. The system of claim 1, wherein the objects include a one-to-many relationship to other objects.

9. The system of claim 1, wherein the objects include a recursive relationship to one other object.

10. The system of claim 1, wherein the filter is based on a relationship between the object and at least one other object.

11. The system of claim 1, wherein the filter is based on an attribute of the object.

12. The system of claim 1, wherein the query follows a path through a graph model.

13. The method of claim 2, wherein the query includes an output flag indicating the object-type of results returned by the execution module.

14. The method of claim 2, wherein the objects include a one-to-many relationship to other objects.

15. The method of claim 2, wherein the objects include a recursive relationship to one other object.

16. The method of claim 2, wherein the filter is based on a relationship between the object and at least one other object.

17. The method of claim 2, wherein the filter is based on an attribute of the object.

18. The method of claim 2, wherein the query follows a path through a graph model.

19. The system of claim 12, wherein the graph model includes content management system (CMS) data.

20. The system of claim 12, wherein the path does not include any internal oops.

* * * * *

UNITED STATES PATENT AND TRADEMARK OFFICE
CERTIFICATE OF CORRECTION

PATENT NO. : 9,104,728 B2  
APPLICATION NO. : 13/626636  
DATED : August 11, 2015  
INVENTOR(S) : Ngai et al.

It is certified that error appears in the above-identified patent and that said Letters Patent is hereby corrected as shown below:

In the claims

In column 11, line 58, in Claim 1, after "phrase", insert --and--, therefor

In column 11, line 67, in Claim 1, after "phrases", insert --;--, therefor

In column 12, line 7, in Claim 1, delete "phases" and insert --phrases--, therefor In column 12, line 48, in Claim 2, delete "identifiers" and insert --identifiers,--, therefor In column 13, line 7, in Claim 3, delete "fitter," and insert --filter,--, therefor In column 14, line 32, in Claim 20, delete "oops." and insert --loops.--, therefor Signed and Sealed this  
Seventh Day of June, 2016

Michelle K. Lee  
*Director of the United States Patent and Trademark Office*